(12) United States Patent
Pu et al.

(10) Patent No.: US 9,857,521 B2
(45) Date of Patent: Jan. 2, 2018

(54) LIQUID CRYSTAL DISPLAY WITH BACKLIGHT COLOR COMPENSATION STRUCTURES

(71) Applicant: Apple Inc., Cupertino, CA (US)

(72) Inventors: Chuan Pu, Foster City, CA (US); Shin-Ying Lu, Cupertino, CA (US); Chenhua You, San Jose, CA (US); Sheng Min Wang, Hsinchu (TW); Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 14/881,065

(22) Filed: Oct. 12, 2015

(65) Prior Publication Data
US 2016/0306090 A1 Oct. 20, 2016

Related U.S. Application Data

(60) Provisional application No. 62/150,066, filed on Apr. 20, 2015.

(51) Int. Cl.
*G02F 1/1335* (2006.01)
*F21V 8/00* (2006.01)

(52) U.S. Cl.
CPC ............ *G02B 6/004* (2013.01); *G02B 6/005* (2013.01); *G02B 6/0011* (2013.01); *G02B 6/0061* (2013.01); *G02B 6/0065* (2013.01); *G02B 6/0068* (2013.01); *G02B 6/0073* (2013.01); *G02F 1/133605* (2013.01); *G02F 1/133609* (2013.01); *G02F 1/133615* (2013.01); *G02B 6/0043* (2013.01); *G02B 6/0051* (2013.01); *G02B 6/0055* (2013.01); *G02B 6/0083* (2013.01)

(58) Field of Classification Search
CPC ....... G02B 6/004; G02B 6/0011; G02B 6/005
USPC .......................................................... 349/65
See application file for complete search history.

(56) References Cited

U.S. PATENT DOCUMENTS 5,866,759 A 3/1999 Mashino et al.
6,345,899 B1 * 2/2002 Ohkawa ............... G02B 6/0038
349/61

(Continued)

FOREIGN PATENT DOCUMENTS

CN 1162757 10/1997
KR 10-2012-0067550 A 6/2012

(Continued)

*Primary Examiner* — Lucy Chien
(74) *Attorney, Agent, or Firm* — Treyz Law Group, P.C.; G. Victor Treyz; Joseph F. Guihan (57) ABSTRACT

A display may have an array of pixels that display images for a user. The backlight unit may have a light-guide layer. An array of light-emitting diodes may emit light into an edge of the light-guide layer. The light guide layer may overlap a backlight reflector. The backlight reflector may include a backlight reflector panel formed from a stack of dielectric layers on a rectangular substrate. The backlight reflector may also include a strip of backlight reflector tape having an edge that is overlapped by an edge portion of the backlight reflector panel. Color compensating features such as printed colored ink patterns may be formed on the backlight reflector to adjust the color of backlight illumination in portions of the backlight unit adjacent to the light-emitting diodes.

15 Claims, 10 Drawing Sheets

(56) References Cited

U.S. PATENT DOCUMENTS

| | | |
|---|---|---|
| 9,028,123 B2 | 5/2015 | Nichol et al. |
| 9,097,825 B1 | 8/2015 | Gupta et al. |
| 2003/0160712 A1* | 8/2003 | Levy .................... H01H 13/702 |
| | | 341/22 |
| 2007/0070625 A1 | 3/2007 | Bang |
| 2011/0090142 A1 | 4/2011 | You et al. |
| 2013/0016415 A1* | 1/2013 | Kurtz ........................ B44F 1/08 |
| | | 359/244 |
| 2013/0148058 A1* | 6/2013 | Zhu ...................... G02B 6/0091 |
| | | 349/65 |
| 2013/0286324 A1 | 10/2013 | Huang |
| 2015/0023057 A1 | 1/2015 | Kim et al. |
| 2015/0036320 A1 | 2/2015 | Ha et al. |
| 2015/0078033 A1 | 3/2015 | Lee et al. |
| 2015/0355399 A1 | 12/2015 | You et al. |

FOREIGN PATENT DOCUMENTS

| | | |
|---|---|---|
| KR | 2012082250 | 7/2012 |
| KR | 10-2014-0083706 A | 7/2014 |
| TW | M486782 U | 9/2014 |

* cited by examiner

LIQUID CRYSTAL DISPLAY WITH BACKLIGHT COLOR COMPENSATION STRUCTURES

This application claims the benefit of provisional patent application No. 62/150,066 filed on Apr. 20, 2015, which is hereby incorporated by reference herein in its entirety.

BACKGROUND

This relates generally to electronic devices, and more particularly, to electronic devices with displays.

Electronic devices often include displays. For example, cellular telephones, tablet computers, and laptop computers often include displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel. A liquid crystal display may have an array of color filter elements to provide the display with the ability to display color images.

The pixels in the liquid crystal display can be backlit using a backlight unit. The backlight unit may include a light guide layer. The light guide layer may be formed from a transparent material such as a transparent polymer. An array of light-emitting diodes may emit light into the edge of the light guide layer. The light that is emitted into the edge of the light guide layer may be distributed throughout the light guide layer in accordance with the principle of total internal reflection.

The light guide layer may be provided with light scattering features that scatter the light that is traveling within the interior of the light guide layer. Light that is scattered outwards from the light guide layer through the pixels of the liquid crystal display can serve as backlight for the display.

Image quality in a backlight liquid crystal display may be adversely affected by variations in backlight color. If care is not taken, portions of a display may have an unwanted color cast. As an example, portions of a display adjacent to the array of light-emitting diodes in the backlight unit may have an undesired bluish cast.

If would therefore be desirable to be able to provide displays such as backlit liquid crystal displays with enhanced color uniformity.

SUMMARY

A display may have an array of pixels that display images for a user. The array of pixels may be formed from liquid crystal display layers. The array of pixels may be provided with backlight illumination by a backlight unit. The backlight unit may have a light-guide layer. An array of light-emitting diodes may emit light into an edge of the light-guide layer.

The light guide layer may overlap backlight reflector. The backlight reflector may include a rectangular backlight panel formed from a stack of reflective dielectric layers on a substrate. The backlight reflector may also include a strip of backlight reflector tape having an edge that is overlapped by an edge portion of the backlight reflector panel.

The light-emitting diodes may be mounted on a flexible printed circuit. The strip of backlight reflector tape may be attached to the flexible printed circuit. Color compensating features such as printed colored ink patterns may be formed on the backlight reflector. For example, printed color ink may be formed on the backlight reflector tape or portions of the backlight reflector panel. The printed colored ink may be formed in the shape of strip of colored ink or a pattern of colored ink dots. The ink may by yellow or may have other colors that help compensate for undesired backlight color variations. If desired, the ink may be thermochromic. The presence of the ink serves to selectively adjust the color of the backlight illumination in portions of the backlight unit adjacent to the light-emitting diodes, thereby maximizing color uniformity.

DETAILED DESCRIPTION

Electronic devices may include displays. The displays may be used to display images to a user. Illustrative electronic devices that may be provided with displays are shown in FIGS. 1, 2, 3, and 4.

Figure 1:
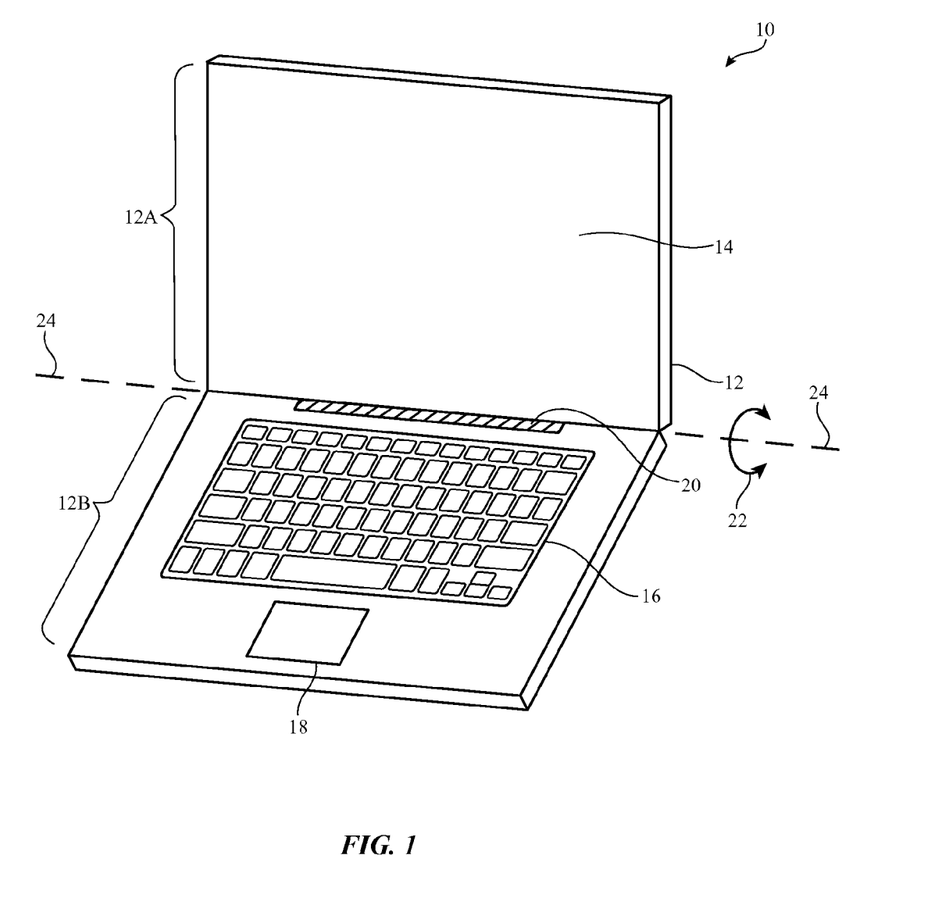
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
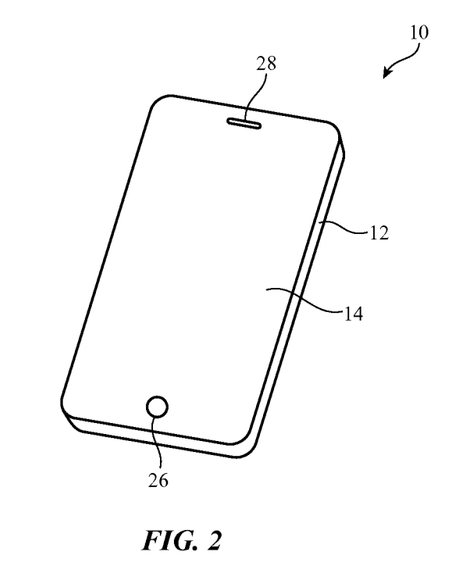
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
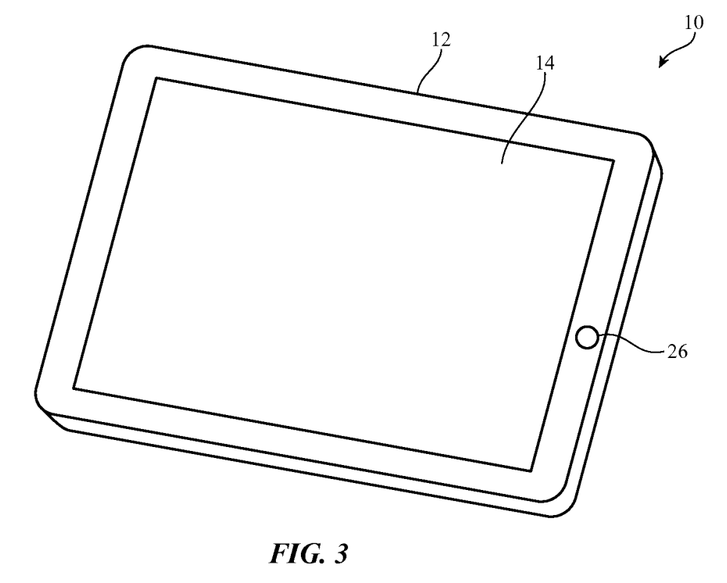
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
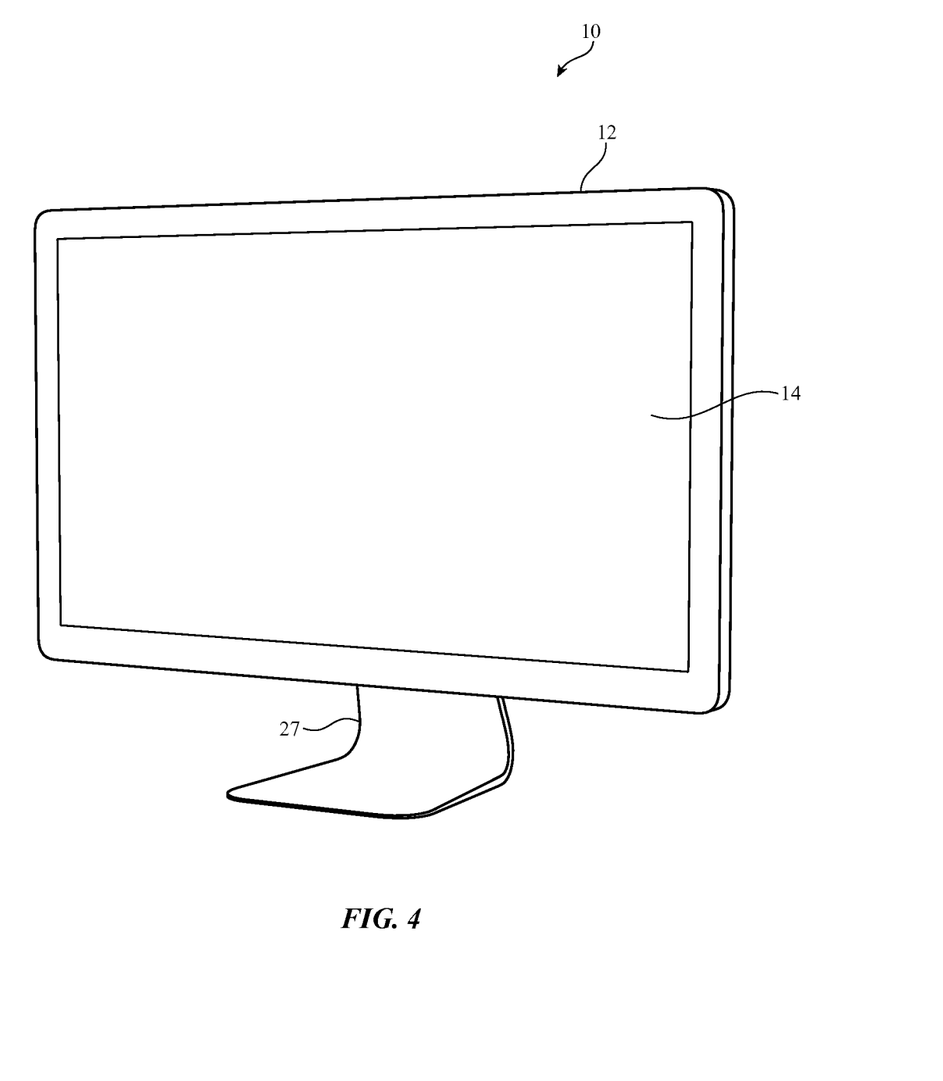
FIG. 4 is a perspective view of an illustrative electronic device such as a computer display with display structures in accordance with an embodiment.

FIG. 4 shows how electronic device 10 may be a display such as a computer display or may be a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
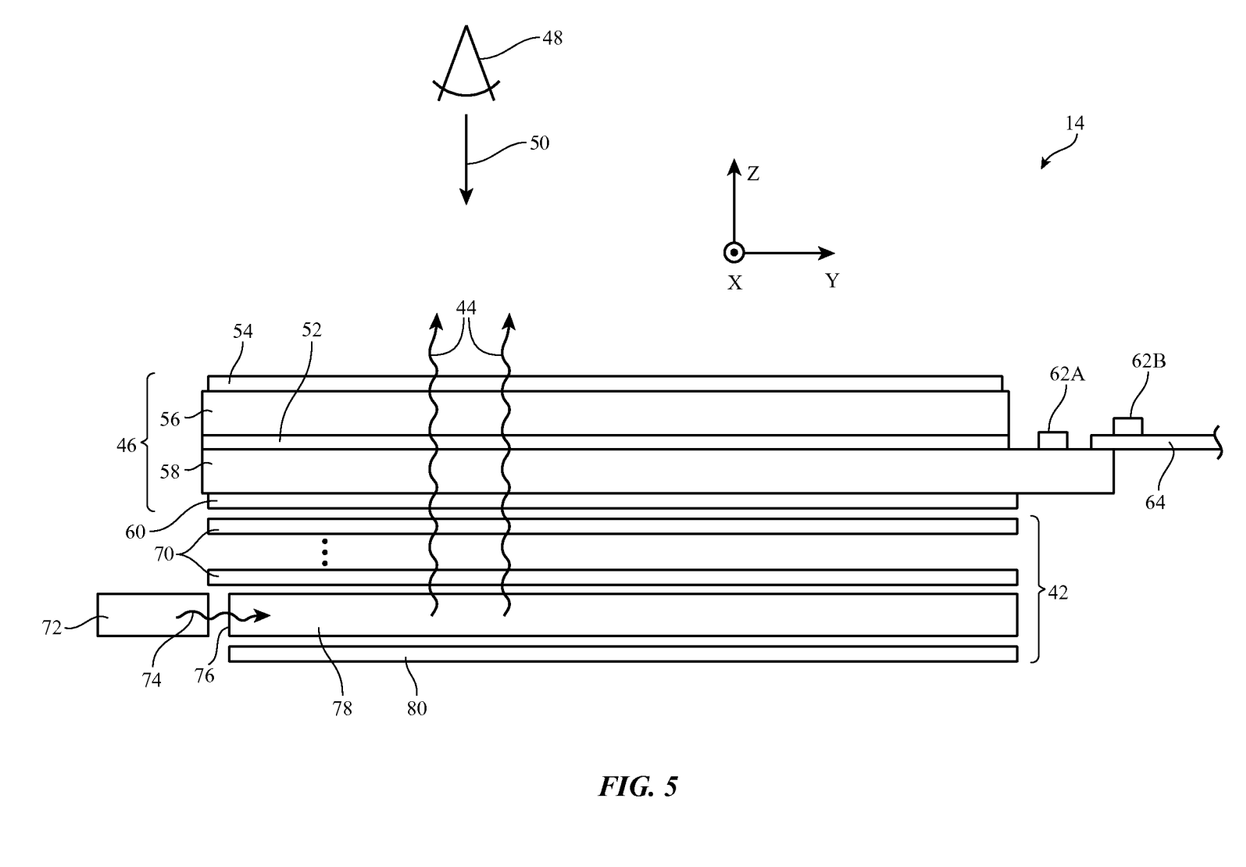
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide layer 78. Light guide layer 78 may be formed from a transparent material such as clear glass or plastic (e.g., molded plastic that forms a light guide plate, a thin flexible plastic film, etc.). During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide layer 78 due to the principal of total internal reflection. Light guide layer 78 may include light-scattering features such as pits or bumps or other light-scattering structures. The light-scattering features may be located on an upper surface and/or on an opposing lower surface of light guide layer 78. Light source 72 may be located at the left of light guide layer 78 as shown in FIG. 5 or may be located along the right edge of layer 78 and/or other edges of layer 78.

Light 74 that scatters upwards in direction Z from light guide layer 78 may serve as backlight 44 for display 14. Light 74 that scatters downwards may be reflected back in the upwards direction by reflector 80. Reflector 80 may be formed from a reflective material such as a layer of plastic covered with a dielectric minor thin-film coating. Reflective tape (e.g., white plastic tape or tape formed from other reflective materials) may be incorporated into the backlight reflector for display 14. For example, backlight structures 42 may include a strip of tape that runs along the edge of reflector 80 that is adjacent to light-emitting diodes 72.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide layer 78 and reflector 80. For example, if light guide layer 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Light 74 from light-emitting diodes 72 may be white light that is converted into desired colors (e.g., red, blue, green, etc.) by color filter elements in color filter layer 56. Due to a variety of non-ideal effects, there is a potential that light 74 (and therefore scattered light 44) will have a different color near diodes 72 than at locations further into light-guide layer 78. These non-ideal effects include temperature gradients (e.g., elevated temperatures near to diodes 72 that induce birefringence variations in layer 52 that can cause the light 44 from backlight structures 42 to be bluish at locations near diodes 72, angular dependence of the output color of light 74 from diodes 72 that can lead to yellower light being emitted at larger angles relative to axis Y of FIG. 5 than the light being emitted at smaller angles relative to axis Y, wavelength-dependent absorption of the material of light guide layer 78 such as absorption that causes yellow light to travel further into layer 78 than blue light so that light 74 is bluer near diodes 72 than at locations farter into layer 78, non-uniformity in layer 52 such as non-uniformities in thickness that may be most pronounced near the edges of structures 42 and that can impact the spectrum of light 44 that is transmitted through layers 46, etc.). These non-ideal effects can lead to visible color casts on a display. For example, the edge of a display next to the light-emitting diodes of the backlight unit may tend to be bluer than desired.

To compensate for undesired color variations in backlight 44, display 14 may be provided with color variation compensation structures (sometimes referred to as color compensating structures, color compensating features, color compensation structures, color variation compensating features, etc.). The color compensating structures may be formed from printed colored ink or other structures that can impart desired colors to backlight 44. As an example, the backlight reflector in structures 42 may be provided with a yellow strip adjacent to light-emitting diodes 72. The presence of the yellow strip in this portion of backlight 42 may help adjust the color of light 44 in the vicinity of light-emitting diodes 72 (e.g., the yellow strip may help convert a strip of overly blue light 44 into light 44 of the same color as the light 44 that is emitted elsewhere in structures 42).

Figure 6:
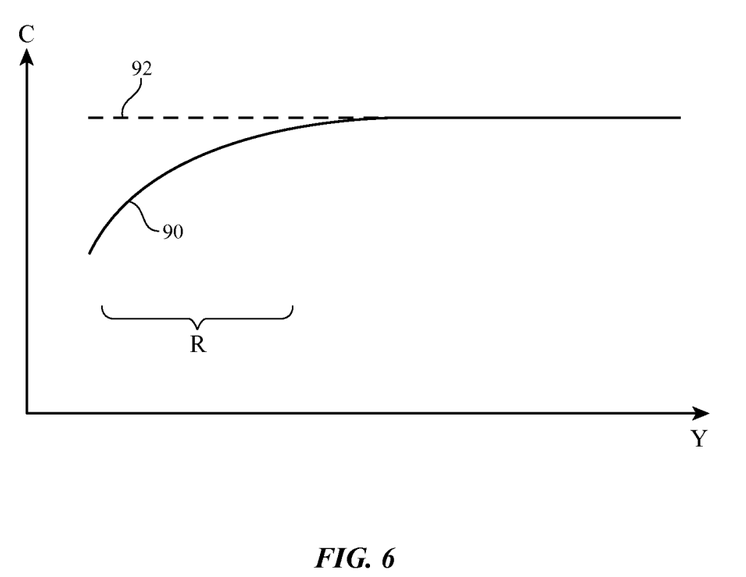
FIG. 6 is a graph in which a color parameter for a display has been plotted as a function of distance from a light-emitting diode array in a backlight for a non-color-compensated display and for a color-compensated display in accordance with an embodiment.

FIG. 6 is a graph in which the color of light 44 (shown as representative color parameter C) has been plotted as a function of distance Y from light-emitting diodes 72. Parameter C may be a color coordinate associated with light 44, may represent the ratio of yellow light to blue light in light 44, may be a color temperature value, or may be any other parameter that is representative of the color of light 44 from structures 42. Line 90 shows how color C may vary as a function of distance Y from light-emitting diodes 72 in a backlight unit without color compensating features. Line 92 corresponds to a display such as display 14 in which a backlight reflector with color compensating features has been incorporated into structures 42. As shown by line 90, the color of backlight 44 may vary significantly near diodes 72 (i.e., in region R) in the absence of color compensating features (e.g., light 44 may be overly blue in region R, as represented by the decrease in curve 90 in region R). When a strip of yellow material is included on the backlight reflector or when other color compensating features are incorporated into structures 42 in region R, the light that is reflected upwards as backlight 44 will tend to be yellower in region R. When the density and color of the yellow material or other color compensating structure in region R has been configured satisfactorily, the amount of color correction that is imposed on backlight 44 in region R will be sufficient to balance out the tendency of the backlight 44 in this region to acquire a blue cast or other undesired color cast. As illustrated by line 92, for example, the color compensating structures may ensure that backlight 44 has a uniform color over all values of distance Y from light-emitting diodes 72 (i.e., the yellow material in region R will counteract the bluish nature of light 44 in region R and will therefore result in light of uniform color C across all of backlight unit 42 and display 14).

In general, color compensating structures may be incorporated into any suitable portion of display 14 (e.g., in layers 46, between layers 46 and backlight structures 42, or within structures 42. With one suitable arrangement, which may sometimes be described herein as an example, reflective structures in backlight structures 42 may be provided with colored portions (e.g., colored ink formed from a polymer containing colored dyes or pigments) or other colored material. Configuration in which these colored portions are formed from colored ink may sometimes be described herein as an example. In general, any suitable materials and/or structures may be used to make color modifications to light 44 that is being emitted from backlight structures 42 and is passing through layers 46 of display 14. The use of color compensating features formed from printed colored ink is merely illustrative.

Colored ink may be deposited on a backlight reflector (e.g., a portion of a reflective rectangular backlight panel formed from a polymer film or other substrate and/or one or more strip-shaped reflective tapes) or other portion of backlight structures 42 using ink-jet printing, screen printing, pad printing, other types of printing, painting, spraying, evaporation or other physical vapor deposition techniques, or other fabrication techniques. Configurations in which colored ink is applied to layers of material in backlight structures 42 using printing are sometimes described herein as an example.

Figure 7:
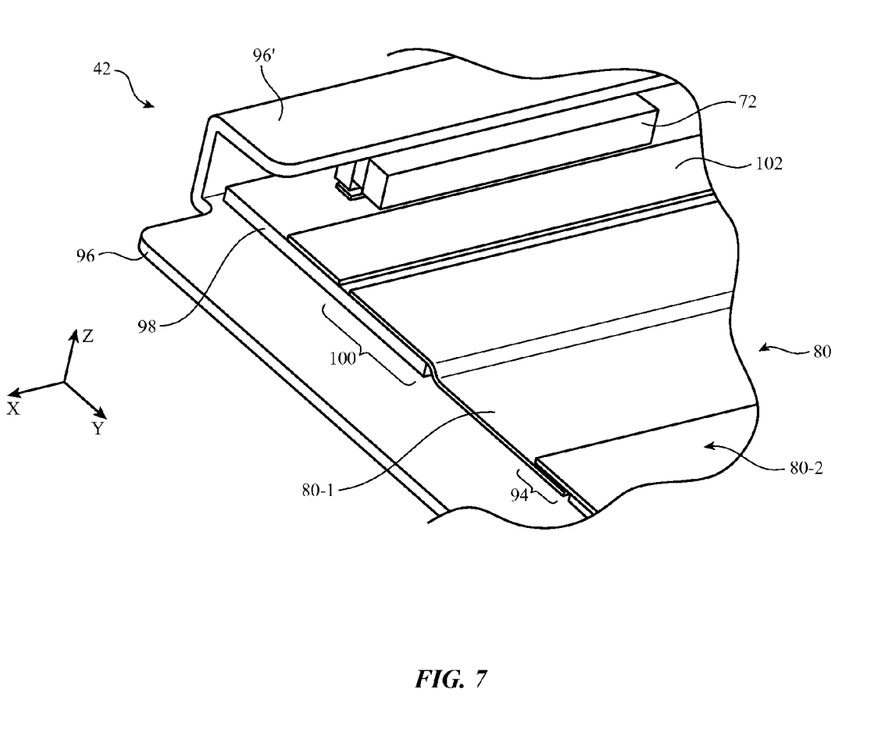
FIG. 7 is a perspective view of an edge portion of a backlight unit having a reflector with a color-compensating layer in accordance with an embodiment.

FIG. 7 is a perspective view of a portion of backlight structures 42 in an illustrative configuration in which color compensating features have been formed from a strip of yellow ink printed on a backlight reflector tape. As shown in FIG. 7, backlight structures 42 may include structures mounted in a chassis such as plastic chassis 96. These structures may include a backlight reflector such as reflector 80. Reflector 80 may include a rectangular layer of reflector material that forms reflector 80-2 (i.e., a rectangular reflector panel that covers most of the area of display 14). Reflector 80-2 may be formed from a stack of repeating (alternating) high-index-of-refraction and low-index-of-refraction dielectric layers or other structures for creating a high reflectively broadband reflective structure (e.g., a reflector with more than 99% reflectivity). Reflector 80-1 may be formed from reflective tape (e.g., white plastic tape or other reflective tape). Reflector 80-1 may have adhesive (e.g., pressure sensitive adhesive or other adhesive). For example, reflector 80-1 may have a layer of adhesive in region 100 to attach reflector 80-1 to flexible printed circuit 98.

Flexible printed circuit 98 may be formed from a layer of polyimide or a flexible sheet of other polymer materials. A portion of the exposed upper surface of flexible printed circuit 98 may be covered with a layer of adhesive such as adhesive 102. Adhesive 102 may have the shape of an elongated strip that runs along the edge of display 14 adjacent to light-emitting diodes 72 and may be used to help secure the edge of light guide layer 78 to flexible printed circuit 98 and thereby hold layer 78 in place within backlight unit 42.

Metal traces in flexible printed circuit 98 may be coupled to a source of current. Light-emitting diodes such as light-emitting diode 72 of FIG. 7 may be soldered to the metal traces of flexible printed circuit 98 (i.e., solder pads formed from the metal traces). There may be, for example, an array of 1-10, more than 2, less than 10, or other suitable number of light-emitting diodes 72 along the edge of display 14. Light-emitting diodes 72 may be formed along one edge of display 14 or may be formed on opposing edges of display 14 (e.g., on the left and right edges of display 14 or on the top and bottom edges of display 14). During operation, the source of current in device 10 can apply current to light-emitting diodes 72 to control the amount of light 74 that is produced by light-emitting diodes 72. Portion 96' may, if desired, overlap light-emitting diodes 72. A portion of the backlight reflector structures in unit 42 (i.e., a top reflector) may overlap light guide layer 78 under portion 96'.

To compensate for undesired color variations in backlight 44, portions of backlight structures 42 may be provided with color compensating features. In the example of FIG. 7, color compensating features have been provided in the form of a strip of colored ink (e.g., yellow ink or ink of other colors) in region 100 of reflective tape 80-1. This is merely illustrative. Colored ink may be provided on other areas of backlight reflector 80 (e.g., on only part of reflector 80-1, on all of reflector 80-1, on only part of reflector 80-2, on all of reflector 80-2, on all of reflector 80-1 and part of reflector 80-2, on part of reflector 80-1 and part of reflector 80-1, on a top reflector under region 96', etc.).

An edge portion of backlight reflector layer 80-2 may overlap an edge portion of backlight reflector layer (tape) 80-1 in region 94. As shown in the cross-sectional side view of backlight structures 42 of FIG. 8, the edge of light-guide layer 78 may overlap the edge of reflector layer 80-2 in an assembled backlight unit. Upper backlight reflector 106 may be interposed between the edge of light-guide layer 78 and overhanging chassis portion 96'. Pressure sensitive adhesive 104 or other adhesive may be used to attach reflective tape 80-1 of backlight reflector 80 to flexible printed circuit 98. Backlight reflector panel 80-2 may overlap tape 80-1 in region 94 (i.e., the edge of tape 80-1 may be placed between reflector 80-2 and chassis 96).

Figure 8:
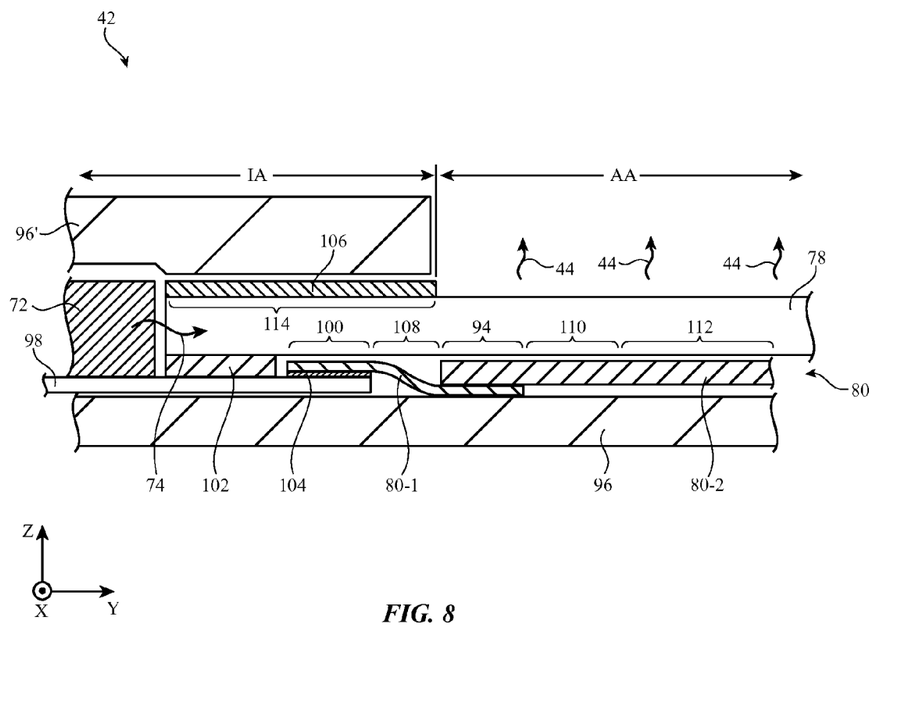
FIG. 8 is a cross-sectional side view of an illustrative backlight unit of the type shown in FIG. 7 in accordance with an embodiment.

The peripheral edge of backlight structures 42 (i.e., a rectangular ring surrounding the four edges of light-guide layer 78) may form an inactive area IA for display 14. Inactive area IA is a portion of display 14 in which backlight 44 is not illuminating display layers 46 and in which the pixels of display layers 46 are not present. The inactive area IA of display 14 may surround an active area AA. Active area AA may have a rectangular shape that contains an array of pixels (i.e., rows and columns of pixels). To ensure uniform color for display 14 in active area AA, color compensating features may be incorporated onto backlight structures 42 in inactive area IA and/or in active area AA. For example, color compensating features may be formed in areas such as area 100 on the edge of tape 80-1 closest to light-emitting diodes 72, in area 108 (e.g., a strip-shaped region of tape 80-1 between area 100 and area 94), in area 94 (e.g., where reflector 80-2 overlaps tape 80-1), in area 110 immediately adjacent to area 94, elsewhere on reflector 80-2 (see, e.g., area 112), and/or on all or part of area 114 on the lower surface of top reflective tape 106 (e.g., a white plastic tape attached to chassis portion 96' with adhesive and/or attached to light-guide layer 78). By incorporating colored ink or other color compensating features into these areas of backlight structures 42, excessively blue backlight 44 can be eliminated or at least reduced along the edge of backlight structure 42 adjacent to light-emitting diodes 72. Color deviations in other areas of display 14 can also be reduced in this way.

Figure 9:
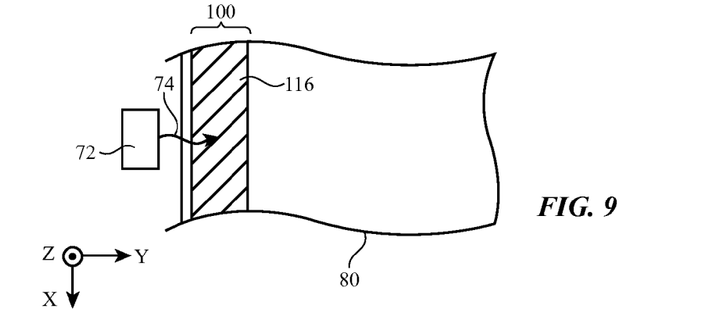
FIG. 9 is a top view of an edge portion of a backlight unit with a strip-shaped color-compensating layer in accordance with an embodiment.

FIGS. 9, 10, 11, and 12 are top views of an edge portion of backlight unit 42 that show illustrative patterns that may be used for the color compensating features in backlight unit 42. In the example of FIG. 9, color compensating structures 116 include a strip of printed colored ink or other color compensating material in region 100. Structures 116 may have an elongated rectangular shape that runs along the edge of reflector 80 adjacent to light-emitting diodes 72.

Figure 10:
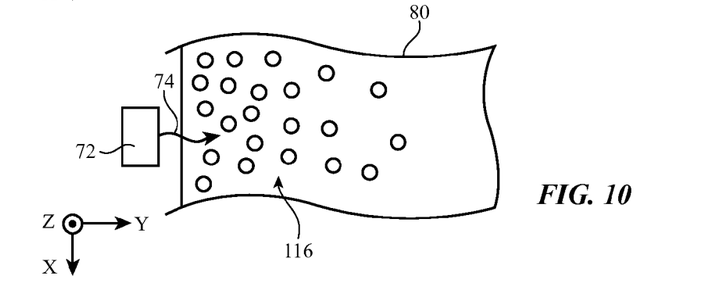
FIG. 10 is a top view of an edge portion of a backlight unit with a color compensating layer having a graduated density in accordance with an embodiment.

In the example of FIG. 10, color compensating structures 116 include a pattern of dots (circular dots, rectangular dots, dots of other shapes, etc.) with a density gradient. In the FIG.

10 example, the density of dots in structures 116 decreases with increasing distance from light-emitting diodes along lateral dimension Y. Other color compensating structures with varying density across the surface of reflector 80 may be used, if desired.

Figure 11:
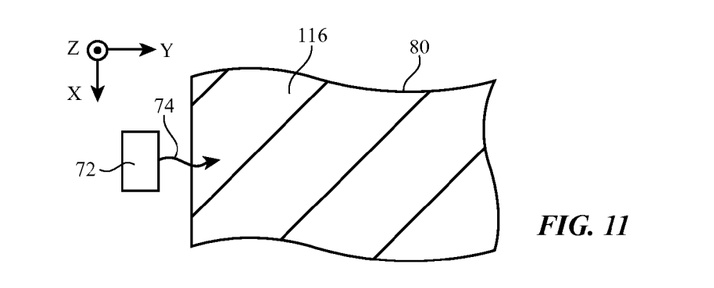
FIG. 11 is a top view of a portion of a backlight unit with a blanket color compensating layer in accordance with an embodiment.

In the example of FIG. 11, all of reflector 80 has been covered with a layer of color compensating structures 116. In this type of arrangement color compensating structures 116 may be formed from a layer of material such as a thermochromic ink that changes color as a function of temperature. When light-emitting diodes 72 heat the edge of reflector 80, the color of structures 116 will change along the heated edge of reflector 80 (e.g., to a yellow color), thereby compensating for color deviations along the edge of display 14.

Figure 12:
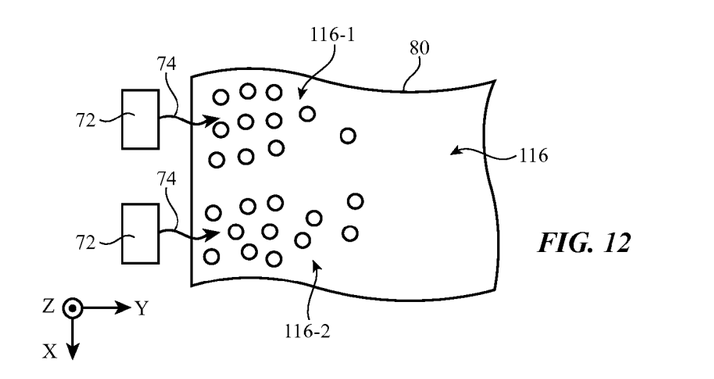
FIG. 12 is a top view of an edge portion of a backlight unit having a spatially varying color compensating layer in accordance with an embodiment.

As shown in the illustrative arrangement of FIG. 12, color compensating structures 116 may be formed in a pattern that varies in density in lateral dimension X (parallel to the edge of display 14 and running along the array of light-emitting diodes 72 that supplies light to the edge of light-guide layer 78) as well as lateral dimension Y. There are two clusters of color compensating structures 116 in this example: cluster 116-1, which is concentrated in front of a first of light-emitting diodes 72, and cluster 116-2, which is concentrated in front of a second of light-emitting diodes 72. This is merely illustrative. There may be any suitable number of clusters of color compensating dots or other structures 116 on reflector 80 (e.g., one cluster for each light-emitting diode 72, etc.).

Figure 13:
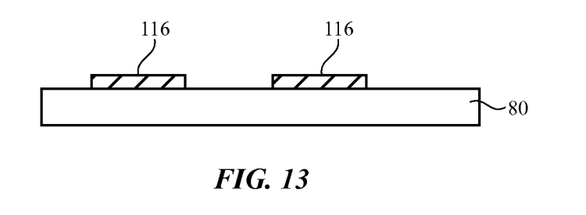
FIG. 13 is a cross-sectional side view of a portion of an illustrative backlight reflector showing how the reflector may have a printed color compensating ink layer in accordance with an embodiment.

The cross-sectional side view of FIG. 13 shows how color compensating structures 116 may be formed from a printed ink layer that has been patterned onto the surface of reflector 80 (e.g., reflector 80-1 and/or reflector 80-2 and/or, if desired, top reflector 106). Structures 116 may be patterned to form a series of dots or discrete areas of other shapes or may be patterned to cover larger sections of reflector 80 (e.g., strip-shaped bands that run along the edge of display 14, blanket films, etc.), as described in connection with FIGS. 9, 10, 11, and 12.

Figure 14:
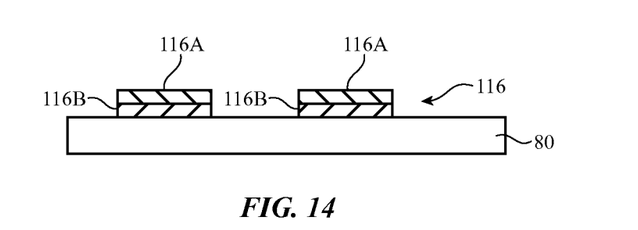
FIG. 14 is a cross-sectional side view of a portion of an illustrative backlight reflector showing how the reflector may have color compensating features formed from multiple layers of ink in accordance with an embodiment.

If desired, multiple layers of printed ink may be used in forming structures 116. For example, a first layer of ink 116B may be covered (in full or in part) with additional layers of ink such as second layer 116A. Layers 116A and 116B may have the same color (e.g., yellow) or may have different colors (e.g., one of layers 116A and 116B may be yellow and the other red, etc.). The use of multiple layers of material when forming structures 116 may allow the optical properties of structures 116 such as reflectively, light scattering, and reflection spectrum (color), to be optimized to maximize color uniformity in backlight 44.

Figure 15:
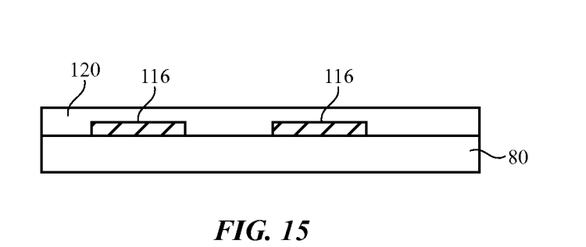
FIG. 15 is a cross-sectional side view of a portion of an illustrative backlight reflector showing how color compensating features may be covered with a transparent protective layer in accordance with an embodiment.

FIG. 15 is a cross-sectional side view of color compensating structures 116 in a configuration in which a transparent protective film such as transparent layer 120 has been placed on top of structures 116. Layer 120 may be formed from a clear polymer (e.g., a cured adhesive), from a transparent inorganic layer (e.g., silicon oxide, etc.), or may be formed from other protective films that overlap color compensating structures 116. The presence of coating layer 120 helps to protect structures 116 from damage due to rubbing from structures in display 14 such as light-guide layer 98.

Figure 16:
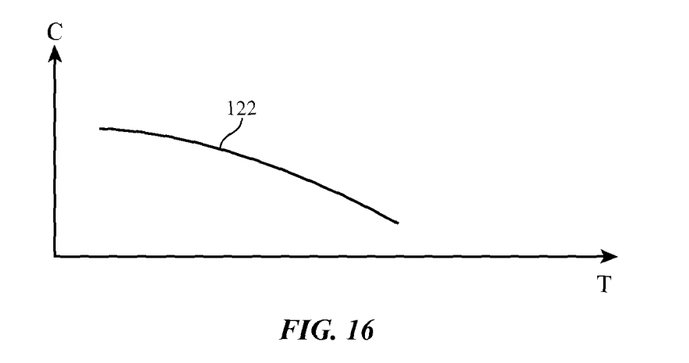
FIG. 16 is a graph showing how the color of light reflected from a color compensating layer may vary as a function of temperature of the layer in accordance with an embodiment.

The ink or other material that is used for forming structures 116 may be yellow pigmented ink (e.g., polymer with yellow pigment), yellow dyed ink (e.g., polymer with yellow dye), polymer that includes dye, pigment, or other additives that impart other colors to structures 116, or other colored structures. If desired, ink 116 may be formed from a thermochromic ink layer such as a cholesterol liquid crystal layer. The color of the light that is reflected from thermochromic ink may change as a function of applied temperature, as illustrated by curve 112 of FIG. 16 in which reflected color C has been plotted as a function of temperature T for an illustrative thermochromic material. Because the temperature of backlight 80 increases in response to the heat being produced from light-emitting diodes 72, the reflected color of a thermochromic material forming structures 116 will change as a function of distance from light-emitting diodes 72. As a result, the color compensation strength of structures 116 can be configured to be strongest (i.e., structures 116 can be most yellow) near to light-emitting diodes 72, where light 44 tends to be undesirably blue.

Figure 17:
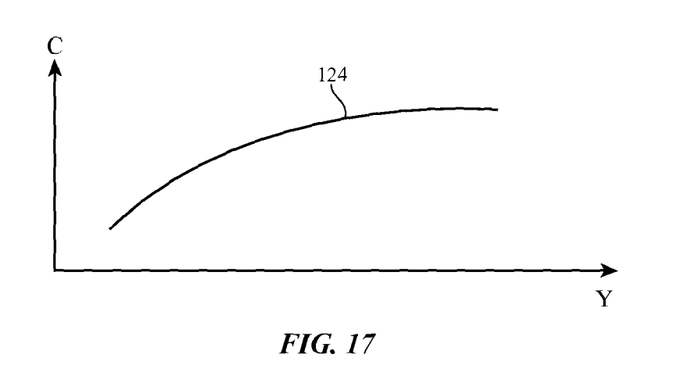
FIG. 17 is a graph showing how the color of a backlight reflector can vary as a function of position due to the incorporation of a color compensating structure in accordance with an embodiment.
Figure 18:
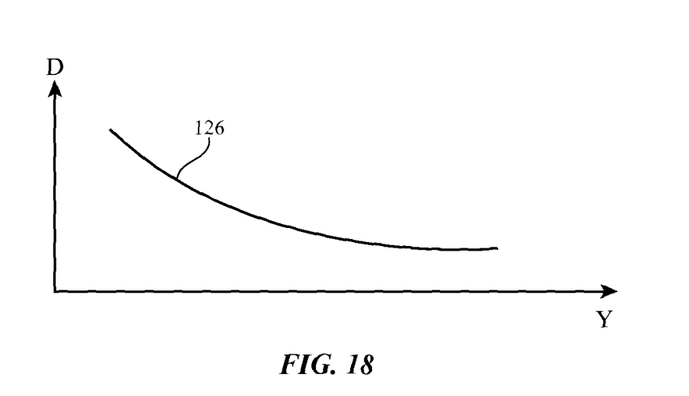
FIG. 18 is a graph showing how the density of ink dots or other color compensating features can vary as a function of position in a backlight reflector in accordance with an embodiment.

If desired, the color of color compensating structures 116 may be changed in a continuous or semi-continuous fashion as a function of lateral distance across the surface of the backlight reflector (e.g., backlight reflector layer 80 and/or upper reflector 106). As shown by curve 124 in FIG. 17, for example, the color C of structures 116 may change as a function of distance Y from light-emitting diodes 72. As illustrated by curve 126 in FIG. 18, the density D of dots or other color-producing attribute in structures 116 may be altered as a function of distance Y (e.g., to make backlight reflector 80 yellowest near light-emitting diodes 72 and increasingly less yellow at increasing distances Y from light-emitting diodes). Other patterns of structures 116 may be used, if desired (e.g., patterns in which the density D of dots or other structures 116 is altered in both the X and Y lateral dimensions, etc.). The configuration of FIG. 18 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    display layers forming an array of pixels; and
    backlight structures that provide backlight illumination for the pixels, wherein the backlight structures include a backlight reflector having color compensating features that enhance color uniformity for the backlight illumination, wherein the backlight reflector comprises a first layer and a second layer, and wherein the backlight structures include a light guide layer with an edge portion interposed between the first layer and the second layer.

2. The display defined in claim 1 wherein the first layer of the backlight reflector comprises a strip of backlight reflector tape and wherein the color compensating features are formed at least partly on the backlight reflector tape.

3. The display defined in claim 2 wherein the color compensating features comprise colored ink features.

4. The display defined in claim 3 wherein the color compensating features comprise printed ink dots.

5. The display defined in claim 4 wherein the printed ink dots have a density that varies as a function of distance across the backlight reflector tape.

6. The display defined in claim 2 wherein the color compensating features comprise a strip of printed colored ink on the backlight reflector tape.

7. The display defined in claim 6 wherein the strip of printed colored ink comprises a yellow strip of printed ink.

8. The display defined in claim 7 wherein the backlight reflector further comprises a backlight reflector panel having an edge that overlaps an edge portion of the backlight reflector tape, wherein the display further comprises a flexible printed circuit on which the light-emitting diodes are mounted, wherein the backlight reflector tape has an edge that overlaps the flexible printed circuit, and wherein the light-emitting diodes emit light into the light guide layer.

9. The display defined in claim 1 wherein the first layer comprises a reflector tape, wherein the second layer comprises a top reflector, and wherein the color compensating features include colored ink on the top reflector.

10. A display, comprising:
display layers forming an array of pixels; and
backlight structures that provide backlight illumination for the pixels, wherein the backlight structures include a backlight reflector having a surface, wherein color compensating features that enhance color uniformity for the backlight illumination are formed on the surface of the backlight reflector, and wherein the color compensating features include thermochromic ink.

11. The display defined in claim 1 wherein the first layer of the backlight reflector includes a backlight reflector tape formed from a white plastic layer, wherein the backlight reflector also includes a rectangular backlight reflector panel having a stack of dielectric layers, and wherein the color compensating features comprise colored ink that covers a portion of the backlight reflector tape and that covers a portion of the backlight reflector panel.

12. A display, comprising:
liquid crystal display layers having an array of pixels; and
backlight structures that provide backlight illumination for the array of pixels, wherein the backlight structures include a backlight reflector, a light-guide layer that overlaps the backlight reflector, and an array of light-emitting diodes emitting light into an edge of the light-guide layer, wherein the backlight structures include colored ink on the backlight reflector that compensates for variations in color of the backlight illumination across the backlight structures, wherein the backlight reflector has a first portion and a second portion, wherein the colored ink is formed on at least the first portion, wherein the first portion of the backlight reflector comprises a strip of white tape, wherein the second portion comprises a backlight reflector panel having a stack of dielectric layers with at least first and second indices of refraction, and wherein an edge portion of the backlight reflector panel overlaps an edge portion of the strip of white tape.

13. The display defined in claim 12 further comprising a clear coating that covers the colored ink.

14. The display defined in claim 12 wherein the colored ink includes first and second colored ink layers of different colors.

15. The display defined in claim 10, wherein all of the surface of the backlight reflector is covered with the thermochromic ink.

* * * * *